(12) United States Patent
Baker et al.

(10) Patent No.: US 8,824,178 B1
(45) Date of Patent: Sep. 2, 2014

(54) PARALLEL POWER CONVERTER TOPOLOGY

(75) Inventors: Gary B. Baker, Sherwood, OR (US); Robert Batten, Tualatin, OR (US); Keith Slavin, Beaverton, OR (US); Triet Tu Le, Portland, OR (US); Vincenzo DiTommaso, Tualatin, OR (US); Ravindranath Naiknaware, Tualatin, OR (US)

(73) Assignee: SolarBridge Technologies, Inc., Austin, TX (US)

( * ) Notice: Subject to any disclaimer, the term of this patent is extended or adjusted under 35 U.S.C. 154(b) by 580 days.

(21) Appl. No.: 12/982,798

(22) Filed: Dec. 30, 2010

Related U.S. Application Data

(60) Provisional application No. 61/291,624, filed on Dec. 31, 2009, provisional application No. 61/370,089, filed on Aug. 2, 2010.

(51) Int. Cl.
*H02M 7/537* (2006.01)

(52) U.S. Cl.
USPC .............................. 363/71; 363/131

(58) Field of Classification Search
CPC .......... H02M 7/493; H02M 7/537; H02J 3/38
USPC .................. 363/37, 65, 131, 35, 71; 323/285; 307/1, 6
See application file for complete search history.

(56) References Cited

U.S. PATENT DOCUMENTS

| | | | |
|---|---|---|---|
| 3,670,230 A | 6/1972 | Rooney et al. | |
| 4,053,820 A | 10/1977 | Peterson et al. | |
| 4,114,048 A | 9/1978 | Hull | |
| 4,217,633 A | 8/1980 | Evans | |
| 4,277,692 A | 7/1981 | Small | |
| 4,287,465 A | 9/1981 | Godard et al. | |

(Continued)

FOREIGN PATENT DOCUMENTS

| | | |
|---|---|---|
| CA | 2353422 C | 3/2004 |
| CA | 2655007 A1 | 8/2010 |

(Continued)

OTHER PUBLICATIONS

Ando et al., "Development of Single Phase UPS Having AC Chopper and Active Filter Ability," IEEE International Conference on Industrial Technology, 10.1109/ICIT.2006.372445, pp. 1498-1503, 2006.

(Continued)

*Primary Examiner* — Adolf Berhane
*Assistant Examiner* — Jye-June Lee
(74) *Attorney, Agent, or Firm* — Barnes & Thornburg LLP

(57) ABSTRACT

A power converter may include a first power path having no energy storage and a second power path having substantial energy storage. The first and second power paths have first and second input waveforms that are complementary with respect to a source waveform. The first power path, which may be more efficient than the second path, may transfer as much power as possible from the input to the output. The energy storage enables the second power path to make up the difference between the power available from the source and the power drawn by the first power path, and to make up the difference between the power demanded by a load and the power supplied by the first path.

22 Claims, 7 Drawing Sheets

(56) References Cited

U.S. PATENT DOCUMENTS

| | | | |
|---|---|---|---|
| 4,415,962 A * | 11/1983 | Kassakian | 363/131 |
| 4,519,022 A | 5/1985 | Glennon | |
| 4,651,265 A | 3/1987 | Stacey et al. | |
| 4,661,758 A | 4/1987 | Whittaker | |
| 4,707,774 A | 11/1987 | Kajita | |
| 4,709,318 A | 11/1987 | Gephart et al. | |
| 4,719,550 A | 1/1988 | Powell et al. | |
| 4,725,740 A | 2/1988 | Nakata | |
| 5,041,959 A | 8/1991 | Walker | |
| 5,148,043 A | 9/1992 | Hirata et al. | |
| 5,160,851 A | 11/1992 | McAndrews | |
| 5,191,519 A | 3/1993 | Kawakami | |
| 5,309,073 A | 5/1994 | Kaneko et al. | |
| 5,343,380 A | 8/1994 | Champlin | |
| 5,473,528 A | 12/1995 | Hirata | |
| 5,668,464 A | 9/1997 | Krein | |
| 5,684,385 A | 11/1997 | Guyonneau et al. | |
| 5,721,481 A | 2/1998 | Narita et al. | |
| 5,745,356 A | 4/1998 | Tassitino | |
| 5,796,182 A | 8/1998 | Martin | |
| 5,801,519 A | 9/1998 | Midya et al. | |
| 5,886,890 A | 3/1999 | Ishida et al. | |
| 5,929,537 A | 7/1999 | Glennon | |
| 5,978,236 A | 11/1999 | Faberman et al. | |
| 5,982,645 A | 11/1999 | Levran et al. | |
| 6,046,402 A | 4/2000 | More | |
| 6,154,379 A | 11/2000 | Okita | |
| 6,157,168 A | 12/2000 | Malik | |
| 6,180,868 B1 | 1/2001 | Yoshino et al. | |
| 6,201,180 B1 | 3/2001 | Meyer et al. | |
| 6,201,319 B1 | 3/2001 | Simonelli et al. | |
| 6,225,708 B1 | 5/2001 | Furukawa | |
| 6,268,559 B1 | 7/2001 | Yamawaki | |
| 6,285,572 B1 | 9/2001 | Onizuka et al. | |
| 6,291,764 B1 | 9/2001 | Ishida et al. | |
| 6,311,279 B1 | 10/2001 | Nguyen | |
| 6,330,170 B1 | 12/2001 | Wang et al. | |
| 6,356,471 B1 | 3/2002 | Fang | |
| 6,369,461 B1 | 4/2002 | Jungreis et al. | |
| 6,381,157 B2 | 4/2002 | Jensen | |
| 6,445,089 B1 | 9/2002 | Okui | |
| 6,462,507 B2 | 10/2002 | Fisher | |
| 6,489,755 B1 | 12/2002 | Boudreaux et al. | |
| 6,563,234 B2 | 5/2003 | Hasegawa et al. | |
| 6,570,268 B1 | 5/2003 | Perry et al. | |
| 6,605,881 B2 | 8/2003 | Takehara et al. | |
| 6,614,132 B2 | 9/2003 | Hockney et al. | |
| 6,624,533 B1 | 9/2003 | Swanson | |
| 6,657,321 B2 | 12/2003 | Sinha | |
| 6,700,802 B2 | 3/2004 | Ulinski et al. | |
| 6,727,602 B2 | 4/2004 | Olson | |
| 6,750,391 B2 | 6/2004 | Bower et al. | |
| 6,765,315 B2 | 7/2004 | Hammerstrom | |
| 6,770,984 B2 | 8/2004 | Pai | |
| 6,795,322 B2 | 9/2004 | Aihara et al. | |
| 6,838,611 B2 | 1/2005 | Kondo et al. | |
| 6,847,196 B2 | 1/2005 | Garabandic | |
| 6,881,509 B2 | 4/2005 | Jungreis | |
| 6,882,063 B2 | 4/2005 | Droppo et al. | |
| 6,950,323 B2 | 9/2005 | Achleitner | |
| 7,031,176 B2 | 4/2006 | Kotsopoulos et al. | |
| 7,072,195 B2 | 7/2006 | Xu | |
| 7,091,707 B2 | 8/2006 | Cutler | |
| 7,173,833 B2 * | 2/2007 | Lin et al. | 363/65 |
| 7,193,872 B2 | 3/2007 | Siri | |
| 7,200,013 B2 * | 4/2007 | Gan et al. | 363/21.04 |
| 7,233,130 B1 | 6/2007 | Kay | |
| 7,289,341 B2 | 10/2007 | Hesterman | |
| 7,319,313 B2 | 1/2008 | Dickerson et al. | |
| 7,324,361 B2 | 1/2008 | Siri | |
| 7,339,287 B2 | 3/2008 | Jepsen et al. | |
| 7,365,998 B2 | 4/2008 | Kumar | |
| 7,372,709 B2 | 5/2008 | Mazumder et al. | |
| 7,405,494 B2 | 7/2008 | Tassitino, Jr. et al. | |
| 7,420,354 B2 | 9/2008 | Cutler | |
| 7,432,691 B2 | 10/2008 | Cutler | |
| 7,463,500 B2 | 12/2008 | West | |
| 7,502,697 B2 | 3/2009 | Holmquist et al. | |
| 7,521,914 B2 | 4/2009 | Dickerson et al. | |
| 7,531,993 B2 | 5/2009 | Udrea et al. | |
| 7,532,493 B2 * | 5/2009 | Lou et al. | 363/65 |
| 7,551,460 B2 | 6/2009 | Lalithambika et al. | |
| 7,577,005 B2 | 8/2009 | Angerer et al. | |
| 7,592,789 B2 | 9/2009 | Jain | |
| 7,609,040 B1 | 10/2009 | Jain | |
| 7,626,834 B2 | 12/2009 | Chisenga et al. | |
| 7,638,899 B2 | 12/2009 | Tracy et al. | |
| 7,646,116 B2 | 1/2010 | Batarseh et al. | |
| 7,660,139 B2 | 2/2010 | Garabandic | |
| 7,667,610 B2 | 2/2010 | Thompson | |
| 7,710,752 B2 * | 5/2010 | West | 363/71 |
| 7,733,679 B2 | 6/2010 | Luger et al. | |
| 7,768,155 B2 | 8/2010 | Fornage | |
| 7,768,800 B2 | 8/2010 | Mazumder et al. | |
| 7,777,587 B2 | 8/2010 | Stevenson et al. | |
| 7,796,412 B2 * | 9/2010 | Fornage | 363/97 |
| RE41,965 E | 11/2010 | West | |
| 7,839,022 B2 | 11/2010 | Wolfs | |
| 7,855,906 B2 | 12/2010 | Klodowski et al. | |
| RE42,039 E | 1/2011 | West et al. | |
| 7,884,500 B2 | 2/2011 | Kernahan | |
| 7,899,632 B2 | 3/2011 | Fornage et al. | |
| 7,916,505 B2 | 3/2011 | Fornage | |
| 8,188,610 B2 * | 5/2012 | Scholte-Wassink | 290/44 |
| 8,279,642 B2 | 10/2012 | Chapman et al. | |
| 2001/0043050 A1 | 11/2001 | Fisher | |
| 2002/0017822 A1 | 2/2002 | Umemura et al. | |
| 2002/0196026 A1 | 12/2002 | Kimura et al. | |
| 2005/0213272 A1 | 9/2005 | Kobayashi | |
| 2006/0067137 A1 | 3/2006 | Udrea | |
| 2006/0083039 A1 | 4/2006 | Oliveira | |
| 2006/0171182 A1 | 8/2006 | Siri et al. | |
| 2007/0040539 A1 | 2/2007 | Cutler | |
| 2007/0040540 A1 | 2/2007 | Cutler | |
| 2007/0133241 A1 | 6/2007 | Mumtaz et al. | |
| 2007/0159866 A1 | 7/2007 | Siri | |
| 2007/0221267 A1 | 9/2007 | Fornage | |
| 2008/0055952 A1 | 3/2008 | Chisenga et al. | |
| 2008/0078436 A1 | 4/2008 | Nachamkin et al. | |
| 2008/0106921 A1 | 5/2008 | Dickerson et al. | |
| 2008/0183338 A1 | 7/2008 | Kimball et al. | |
| 2008/0203397 A1 | 8/2008 | Amaratunga et al. | |
| 2008/0266922 A1 | 10/2008 | Mumtaz et al. | |
| 2008/0272279 A1 | 11/2008 | Thompson | |
| 2008/0283118 A1 | 11/2008 | Rotzoll et al. | |
| 2008/0285317 A1 | 11/2008 | Rotzoll | |
| 2008/0304296 A1 | 12/2008 | NadimpalliRaju et al. | |
| 2009/0000654 A1 | 1/2009 | Rotzoll et al. | |
| 2009/0020151 A1 | 1/2009 | Fornage | |
| 2009/0066357 A1 | 3/2009 | Fornage | |
| 2009/0073726 A1 | 3/2009 | Babcock | |
| 2009/0079383 A1 | 3/2009 | Fornage et al. | |
| 2009/0080226 A1 | 3/2009 | Fornage | |
| 2009/0084426 A1 | 4/2009 | Fornage et al. | |
| 2009/0086514 A1 | 4/2009 | Fornage et al. | |
| 2009/0097283 A1 | 4/2009 | Krein et al. | |
| 2009/0147554 A1 | 6/2009 | Adest et al. | |
| 2009/0184695 A1 | 7/2009 | Mocarski | |
| 2009/0200994 A1 | 8/2009 | Fornage | |
| 2009/0225574 A1 | 9/2009 | Fornage | |
| 2009/0230782 A1 | 9/2009 | Fornage | |
| 2009/0242272 A1 | 10/2009 | Little et al. | |
| 2009/0243587 A1 | 10/2009 | Fornage | |
| 2009/0244929 A1 | 10/2009 | Fornage | |
| 2009/0244939 A1 | 10/2009 | Fornage | |
| 2009/0244947 A1 | 10/2009 | Fornage | |
| 2009/0296348 A1 | 12/2009 | Russell et al. | |
| 2010/0085035 A1 | 4/2010 | Fornage | |
| 2010/0088052 A1 | 4/2010 | Yin et al. | |
| 2010/0091532 A1 | 4/2010 | Fornage | |
| 2010/0106438 A1 | 4/2010 | Fornage | |
| 2010/0118568 A1 | 5/2010 | Helle et al. | |
| 2010/0139945 A1 | 6/2010 | Dargatz | |
| 2010/0157632 A1 | 6/2010 | Batten et al. | |

(56) References Cited

U.S. PATENT DOCUMENTS

| | | | |
|---|---|---|---|
| 2010/0157638 | A1 | 6/2010 | Naiknaware et al. |
| 2010/0175338 | A1 | 7/2010 | Garcia Cors |
| 2010/0176771 | A1 | 7/2010 | Fieldhouse et al. |
| 2010/0181830 | A1 | 7/2010 | Fornage et al. |
| 2010/0195357 | A1 | 8/2010 | Fornage et al. |
| 2010/0214808 | A1 | 8/2010 | Rodriguez |
| 2010/0222933 | A1 | 9/2010 | Smith et al. |
| 2010/0236612 | A1 | 9/2010 | Khajehoddin et al. |
| 2010/0263704 | A1 | 10/2010 | Fornage et al. |
| 2010/0283325 | A1 | 11/2010 | Marcianesi et al. |
| 2010/0309695 | A1 | 12/2010 | Fornage |
| 2011/0012429 | A1 | 1/2011 | Fornage |
| 2011/0019444 | A1 | 1/2011 | Dargatz et al. |
| 2011/0026281 | A1 | 2/2011 | Chapman et al. |
| 2011/0026282 | A1 | 2/2011 | Chapman et al. |
| 2011/0043160 | A1 | 2/2011 | Serban |
| 2011/0049990 | A1 | 3/2011 | Amaratunga et al. |
| 2011/0051820 | A1 | 3/2011 | Fornage |
| 2011/0130889 | A1 | 6/2011 | Khajehoddin et al. |

FOREIGN PATENT DOCUMENTS

| | | | |
|---|---|---|---|
| CA | 2693737 | A1 | 8/2010 |
| DE | 20012131 | U1 | 3/2001 |
| EP | 1794799 | A1 | 6/2007 |
| EP | 1803161 | A1 | 7/2007 |
| EP | 1837985 | A2 | 9/2007 |
| GB | 2419968 | A | 5/2006 |
| GB | 2421847 | A | 7/2006 |
| GB | 2439648 | A | 1/2008 |
| GB | 2434490 | B | 4/2009 |
| GB | 2454389 | A | 5/2009 |
| GB | 2455753 | A | 6/2009 |
| GB | 2455755 | A | 6/2009 |
| NL | 1021582 | C2 | 4/2004 |
| NL | 1021591 | C2 | 4/2004 |
| WO | 2004008619 | A2 | 1/2004 |
| WO | 2004100348 | A1 | 11/2004 |
| WO | 2004100348 | A8 | 12/2005 |
| WO | 2006048688 | A1 | 5/2006 |
| WO | 2007080429 | A2 | 7/2007 |
| WO | 2009081205 | A2 | 7/2009 |
| WO | 2009081205 | A3 | 10/2009 |
| WO | 2009134756 | A1 | 11/2009 |

OTHER PUBLICATIONS

Biel et al., "Sliding-Mode Control Design of a Boost-Buck Switching Converter for AC Signal Generation," vol. 51, issue 8, pp. 1539-1551, 2004.
Biel et al., "Sliding-Mode Control of a Single-Phase AC/DC/AC Converter," Proceedings of the 40th IEEE Conference on Decision and Control, vol. 1., pp. 903-907, Dec. 2001.
Bose et al., "Electrolytic Capacitor Elimination in Power Electronic System by High Frequency Filter," Conference Record of the 1991 IEEE Industry Applications Society Annual Meeting, vol. 1, pp. 869-878, 1991.
Bower et al., "Innovative PV Micro-inverter Topology Eliminates Electrolytic Capacitors for Longer Lifetime," Conference Record of the 2006 IEEE 4th World Conference on Photovoltaic Energy Conversion, vol. 2, pp. 2038-2041, May 2006.
Bower, "The AC PV Building Block-Ultimate Plug-n-Play That Brings Photovoltaics Directly to the Customer," Proceedings of the National Center for Photovoltaics (NCPV) and Solar Program Review Meeting, pp. 311-314, May 2003.
Brekken et al., "Utility-Connected Power Converter for Maximizing Power Transfer From a Photovoltaic Source While Drawing Ripple-Free Current," 2002 IEEE 33rd Annual Power Electronics Specialists Conference, vol. 3, pp. 1518-1522, 2002.
Brekken, "Utility-Connected Power Converter for Maximizing Power Transfer From a Photovoltaic Source," Thesis Submitted to the Faculty of the Graduate School of the University of Minnesota, Jun. 2002, 56 pages.
Bush, "UK Solar Firm Discloses Novel Inverter Topology," ElectronicsWeekly.com. Apr. 2011, last accessed Aug. 30, 2011 at http://www.electronicsweekly.com/Articles/2011/O4/26/50953/UK-solar-firm-discloses-novel-inverter-topology.htm.
Chang et al., "The Impact of Switching Strategies on Power Quality for Integral Cycle Controllers," IEEE Transactions on Power Delivery, vol. 18, No. 3, pp. 1073-1078, Jul. 2003.
Chisenga, "Development of a Low Power Photovoltaic Inverter for Connection to the Utility Grid," PhD Thesis, Fitzwilliam College, Cambridge, 173 pages, 2007.
Di Napoli et al., "Multiple-Input DC-DC Power Converter for Power-Flow Management in Hybrid Vehicles," Conference Rec. IEEE Industrial Applications Soc. Annual Meeting, pp. 1578-1585, 2002.
Edelmoser, "Improved Solar Inverter With Wide Input Voltage Range," IEEE 10th Mediterranean Conference, MEleCon 2000, vol. 2, pp. 810-813, 2000.
Enphase Energy, "Application Note: Multi-Tenant Design Guidelines," rev. 1, 5 pages, 2008.
Enphase Energy, "Enphase Field Wiring Diagram—M190 & M210 Microinverters—240v, Single Phase," Drawing No. 144-00001, rev. 6, 1 page, 2009.
Enphase Energy, "Enphase Micro-Inverter Technical Data," Doc. No. 142-00004, rev. 2, 2 pages, 2008.
Esram et al., "Comparison of Photovoltaic Array Maximum Power Point Tracking Techniques," IEEE Transactions on Energy Conversion, vol. 22, No. 2, pp. 439-449, Jun. 2007.
Henze et al., "A Novel AC Module with High-Voltage Panels in CIS Technology," 23rd European Photovoltaic Solar Energy Conference, Valencia, Spain, ISBN 3-936338-24-8, 8 pages, Sep. 2008.
Hu et al., "Efficiency Improvement of Grid-tied Inverters at Low Input Power Using Pulse Skipping Control Strategy," Twenty-Fifth Annual IEEE Applied Power Electronics Conference and Exposition, pp. 627-633, Feb. 2010.
Hung et al., "Analysis and Implementation of a Delay-compensated Deadbeat Current Controller for Solar Inverters," IEEE Proceedings—Circuits, Devices and Systems, pp. 279-286, 2001.
Itoh et al., "Ripple Current Reduction of a Fuel Cell for a Single-Phase Isolated Converter using a DC Active Filter with a Center Tap," Twenty-Fourth Annual IEEE Applied Power Electronics Conference and Exposition, APEC '09, pp. 1813-1818, 2009.
Jantsch et al., "AC PV Module Inverters With Full Sine Wave Burst Operation Mode for Improved Efficiency of Grid Connected Systems at Low Irradiance," Proceedings of the 14th European Photovoltaic Solar Energy Conference, 5 pages, 1997.
Jeong et al., "An Improved Method for Anti-Islanding by Reactive Power Control," pp. 965-970, 2005.
Jung et al., "A Feedback Linearizing Control Scheme for a PWM Converter-Inverter Having a Very Small DC-Link Capacitor," IEEE Transactions on Industry Applications, vol. 35., issue 5, pp. 1124-1131, 1999.
Jung et al., "High-frequency DC Link Inverter for Grid-Connected Photovoltaic System," Conference Record of the Twenty-Ninth IEEE Photovoltaic Specialists Conference, pp. 1410-1413, 2002.
Kern, "SunSine300: Manufacture of an AC Photovoltaic Module, Final Report, Phases I & II, Jul. 25, 1995-Jun. 30, 1998," NREL/SR-520-26085, 1999, 32 pages.
Khajehoddin et al., "A Nonlinear Approach to Control Instantaneous Power for Single-phased Grid-connected Photovoltaic Systems," IEEE Energy Conversion Congress and Exposition (ECCE), pp. 2206-2212, 2009.
Khajehoddin et al., "A Novel Topology and Control Strategy for Maximum Power Point Trackers and Multi-string Grid-connected PV Inverters," Applied Power Electronics Conference, APECO8, pp. 173-178, 2008.
Khajehoddin et al., "A Robust Power Decoupler and Maximum Power Point Tracker Topology for a Grid-Connected Photovoltaic System," IEEE Power Electronics Specialists Conference, PESCO8, pp. 66-69, 2008.
Kim et al., "New Control Scheme for AC-DC-AC Converter Without DC Link Electrolytic Capacitor," 24th Annual IEEE Power Electronics Specialists Conference, PESC '93 Record., pp. 300-306, 1993.
Kitano et al., "Power Sensor-less MPPT Control Scheme Utilizing Power Balance at DC Link—System Design to Ensure Stability and

(56) References Cited

OTHER PUBLICATIONS

Response," The 27th Annual Conference of the IEEE Industrial Electronics Society, vol. 2, pp. 1309-1314, 2001.
Kern, "Inverter Technology for the Solar Industry," Siemens Energy & Automation, 2009, 20 pages.
Curran, "Grid-Connected Solar Microinverter Reference Design," Microchip Technology Incorporated, 2010, 31 pages.
International Search Report for Application No. PCT/US2010/041149, dated Sep. 7, 2010, 11 pages.
Nikraz et al., "Digital Control of a Voltage Source Inverter in Photovoltaic Applications," 35th Annual IEEE Power Electronics Specialists Conference, pp. 3266-3271, 2004.
Oldenkamp et al., "AC Modules: Past, Present and Future, Workshop Installing the Solar Solution," Jan. 1998, Hatfield, UK, 6 pages.
Pajic et al., "Unity Power Factor Compensation for Burst Modulated Loads," IEEE Power Engineering Society General Meeting, vol. 2, pp. 1274-1277, 2003.
Ramos et al., "A Fixed-Frequency Quasi-Sliding Control Algorithm: Application to Power Inverters Design by Means of FPGA Implementation," IEEE Transactions on Power Electronics, vol. 18, No. 1, pp. 344-355, Jan. 2003.
Rodriguez et al., "Analytic Solution to the Photovoltaic Maximum Power Point Problem," IEEE Transactions on Circuits and Systems, vol. 54, No. 9, pp. 2054-2060, Sep. 2007.
Rodriguez et al., "Dynamic Stability of Grid-Connected Photovoltaic Systems," Power Engineering Society General Meeting, vol. 2, pp. 2193-2199, 2004.
Rodriguez et al., "Long-Lifetime Power Inverter for Photovoltaic AC Modules," IEEE Transaction on Industrial Electronics, vol. 55, No. 7, pp. 2593-2601, Jul. 2008.
Ropp et al., "Determining the Relative Effectiveness of Islanding Detection Methods Using Phase Criteria and Nondetection Zones," IEEE Transactions on Energy Conversion, vol. 15, No. 3, pp. 290-296, Sep. 2000.
Russell et al., "SunSine300 AC Module, Annual Report Jul. 25, 1995-Dec. 31, 1996," NREL/SR-520-23432, UC Category 1280, 1997, 31 pages.
Schmidt et al., "Control of an Optimized Converter for Modular Solar Power Generation," 20th International Conference on Industrial Electronics, Control and Instrumentation, vol. 1, pp. 479-484, 1994.
Schutten et al., "Characteristics of Load Resonant Converters Operated in a High-Power Factor Mode," IEEE, Trans. Power Electronics, vol. 7, No. 2, pp. 5-16, 1991.
Sen et al., "A New DC-To-AC Inverter With Dynamic Robust Performance," 1998 IEEE Region 10 International Conference on Global Connectivity in Energy, Computer, Communication and Control, vol. 2, pp. 387-390, 1998.
Shimizu et al., "Flyback-Type Single-Phase Utility Interactive Inverter with Power Pulsation Decoupling on the DC Input for an AC Photovoltaic Module System," IEEE, Trans. Power Electronics, vol. 21, No. 5, pp. 1264-1272, Sep. 2006.
Singh et al., "Comparison of PI, VSC and Energy Balance Controller for Single Phase Active Filter Control," 1998 IEEE Region 10 International Conference on Global Connectivity in Energy, Computer, Communication and Control, vol. 2, pp. 607-614, 1998.
Strong et al., "Development of Standardized, Low-Cost AC PV Systems—Phase I Annual Report," NREL/SR-520-23002, Jun. 1997, 18 pages.
Strong et al., "Development of Standardized, Low-Cost AC PV Systems—Final Technical Report," NREL/SR-520-26084, Feb. 1999, 27 pages.
Sung et al., "Novel Concept of a PV Power Generation System Adding the Function of Shunt Active Filter," 2002 Transmission and Distribution Conference and Exhibition: Asia Pacific, vol. 3, pp. 1658-1663, 2002.
Takahashi et al., "Development of Long Life Three Phase Uninterruptible Power Supply Using Flywheel Energy Storage Unit," Proc. Int'l. Conf. Power Electronics, vol. 1, pp. 559-564, 1996.
Takahashi et al., "Electrolytic Capacitor-Less PWM Inverter," in Proceedings of the IPEC '90, Tokyo, Japan, pp. 131-138, Apr. 2-6, 1990.
Thomas et al., "Design and Performance of Active Power Filters," IEEE IAS Magazine, 9 pages, 1998.
Tian, "Solar-Based Single-Stage High-Efficiency Grid-Connected Inverter," Masters Thesis, University of Central Florida, Orlando, 83 pages, 2005.
Vezzini et al., "Potential for Optimisation of DC-DC Converters for Renewable Energy by use of High Bandgap Diodes," 35th Annual IEEE Power Electronics Specialists Conference, vol. 5, 3836-3842, 2004.
Wada et al., "Reduction Methods of Conducted EMI Noise on Parallel Operation for AC Module Inverters," 2007 IEEE Power Electronics Specialists Conference, pp. 3016-3021, Jun. 2007.
Wu et al., "A Single-Phase Inverter System for PV Power Injection and Active Power Filtering With Nonlinear Inductor Consideration," IEEE Transactions on Industry Applications, vol. 41, No. 4, pp. 1075-1083, 2005.
Wu, et al., "A 1φ 3W Grid-Connection PV Power Inverter with APF Based on Nonlinear Programming and FZPD Algorithm," Eighteenth Annual IEEE Applied Power Electronics Conference and Exposition, APEC '03, vol. 1, pp. 546-5552, 2003.
Wu, et al., "A 1φ 3W Grid-Connection PV Power Inverter with Partial Active Power Filter," IEEE Transactions on Aerospace and Electronic Systems, vol. 39, No. 2, pp. 635-646, Apr. 2003.
Wu, et al., "PV Power Injection and Active Power Filtering With Amplitude-Clamping and Amplitude-Scaling Algorithms," IEEE Trans. on Industry Applications, vol. 43, No. 3, pp. 731-741, 2007.
Xue et al., "Topologies of Single-Phase Inverters for Small Distributed Power Generators: An Overview," IEEE Transactions on Power Electronics, vol. 19, No. 5, pp. 1305-1314, 2004.
Kjaer et al., "A Novel Single-Stage Inverter for the AC-module with Reduced Low-Frequency Ripple Penetration," EPE 2003, ISBN 90-75815-07-7, 10 pages, 2003.
Kjaer et al., "A Review of Single-phase Grid-connected Inverters for Photovoltaic Modules," IEEE Trans on Power Electronics, vol. 41, No. 5, pp. 1292-1306, 2005.
Kjaer et al., "Design Optimization of a Single Phase Inverter for Photovoltaic Applications," IEEE 34th Annual Power Electronics Specialist Conference, PESC '03, vol. 3, pp. 1183-1190, 2003.
Kjaer et al., "Power Inverter Topologies for Photovoltaic Modules—A Review," Conf. record of the 37th Industry Applications Conference, vol. 2, pp. 782-788, 2002.
Kjaer, "Design and Control of an Inverter for Photovoltaic Applications," PhD Thesis, Aalborg University Institute of Energy Technology, 236 pages, 2005.
Kjaer, "Selection of Topologies for the PHOTOENERGYTM Project," Aalborg University Institute of Energy Technology, 37 pages, 2002.
Kotsopoulos et al., "A Predictive Control Scheme for DC Voltage and AC Current in Grid-Connected Photovoltaic Inverters with Minimum DC Link Capacitance," The 27th Annual Conference of the IEEE Industrial Electronics Society, vol. 3, pp. 1994-1999, 2001.
Kotsopoulos et al., "Predictive DC Voltage Control of Single-Phase PV Inverters with Small DC Link Capacitance," 2003 IEEE International Symposium on Industrial Electronics, vol. 2, pp. 793-797, 2003.
Kutkut, "PV Energy Conversion and System Integration," Florida Energy Systems Consortium, 2009, 24 pages.
Kwon et al., "High-efficiency Module-integrated Photovoltaic Power Conditioning System," IET Power Electronics, doi: 10.1049/iet-pel.2008.0023, 2008.
Lohner et al., "A New Panel-integratable Inverter Concept for Grid-Connected Photovoltaic Systems," IEEE ISIE '96, vol. 2, pp. 827-831, 1996.
Martins et al., "Analysis of Utility Interactive Photovoltaic Generation System Using a Single Power Static Inverter," Conference Record of the Twenty-Eighth IEEE Photovoltaic Specialists Conference, pp. 1719-1722, 2000.

(56) References Cited

OTHER PUBLICATIONS

Martins et al., "Interconnection of a Photovoltaic Panels Array to a Single-Phase Utility Line From a Static Conversion System," Proc. IEEE Power Electronics Specialists Conf., pp. 1207-1211, 2000.

Martins et al., "Usage of the Solar Energy from the Photovoltaic Panels for the Generation of Electrical Energy," The 21st International Telecommunication Energy Conference, 6 pages, 1999.

Matsui et al, "A New Maximum Photovoltaic Power Tracking Control Scheme Based on Power Equilibrium at DC Link," Conference Record of the 1999 IEEE Thirty-Fourth IAS Annual Meeting, vol. 2, pp. 804-809, 1999.

Meinhardt et al., "Miniaturised 'low profile' Module Integrated Converter for Photovoltaic Applications with Integrated Magnetic Components," IEEE APEC '99, vol. 1, pp. 305-311, 1999.

Meza et al., "Boost-Buck Inverter Variable Structure Control for Grid-Connected Photovoltaic Systems," IEEE International Symposium on Circuits and Systems, vol. 2, pp. 1318-1321, 2005.

Midya et al., "Dual Switched Mode Power Converter," 15th Annual Conference of IEEE Industrial Electronics Society, vol. 1, pp. 155-158, Mar. 1989.

Midya et al., "Sensorless Current Mode Control—An Observer-Based Technique for DC-DC Converters," IEEE Transactions on Power Electronics, vol. 16, No. 4, pp. 522-526, Jul. 2001.

\* cited by examiner

PARALLEL POWER CONVERTER TOPOLOGY

CROSS-REFERENCE TO RELATED APPLICATIONS

This application claims priority from U.S. Provisional Patent Application Ser. No. 61/291,624 titled Parallel Power Converter Topology filed Dec. 31, 2009 and U.S. Provisional Patent Application Ser. No. 61/370,089 titled Inverters With Combined Converters and Current Source filed Aug. 2, 2010.

BACKGROUND

Power converters are used to convert electric power from one form to another, for example, to convert direct current (DC) power to alternating current (AC) power. One important application for power converters is in transferring power from energy sources such as solar panels, batteries, fuel cells, etc., to electric power distribution systems such as local and regional power grids. Most power grids operate on AC current at a line (or mains) frequency of 50 or 60 cycles per second (Hertz or Hz). Power in a single phase AC grid flows in a pulsating manner with power peaks occurring at twice the line frequency, i.e., 100 Hz or 120 Hz. In contrast, many energy sources supply DC power in a steady manner. Therefore, a power conversion system for transferring power from a DC source to an AC grid typically includes some form of energy storage to balance the steady input power with the pulsating output power.

This can be better understood with reference to FIG. 1 which illustrates the mismatch between a DC power source and a 60 Hz AC load. As shown, the amount of power available from the DC source is constant (or could be varying slowly). However, the amount of power transferred to the load is of the form sine-squared which is the product of the sinusoidal load voltage, and the corresponding sinusoidal load current. As shown, the sine-squared load-power waveform fluctuates from the zero power level at the minimum of the sin-squared waveform to a maximum value and back down to minimum twice every line cycle. For a system with a grid frequency, f_grid, a cycle-time corresponding to twice the line frequency is given by 1/(2*f_grid), which is 10 millisecond (ms) for 50 Hz systems, and 8.33 ms for 60 Hz system. During time T1, the power available from the DC source exceeds the instantaneous power required by the AC load. During time T2, however, the maximum power available from the DC source is less than that required by the AC load.

FIG. 2 illustrates a conventional system for converting DC power from a photovoltaic (PV) panel to AC power. The PV panel 10 generates a DC output current $I_{PV}$ at a typical voltage $V_{PV}$ of about 35 volts, but panels having other output voltages may be used. A DC/DC converter 12 boosts $V_{PV}$ to a link voltage $V_{DC}$ of a few hundred volts. A DC/AC inverter 14 converts the DC link voltage to an AC output voltage $V_{GRID}$. In this example, the output is assumed to be 120VAC at 60 Hz to facilitate connection to a local power grid, but other voltages and frequencies may be used.

The system of FIG. 2 also includes a DC link capacitor $C_{DC}$ and a decoupling capacitor $C_1$. Either or both of these capacitors may perform an energy storage function to balance the nominally steady power flow from the PV panel with the fluctuating power requirements of the grid. Power ripple within the system originates at the DC/AC inverter 14, which must necessarily transfer power to the grid in the form of 120 Hz ripple. In the absence of a substantial energy storage device, this current ripple would be transferred all the way back to the PV panel where they would show up as fluctuations (or "ripple") in the panel voltage $V_{PV}$ and/or current $I_{PV}$. Therefore, the DC link capacitor $C_{DC}$ or the decoupling capacitor $C_1$, is used to store enough energy on a cycle-by-cycle basis to reduce the ripple at the PV panel to an acceptable level.

In a relatively recent development, the ripple at the PV panel has been reduced to essentially zero through the use of one or more control loops that cause the DC/DC converter 12 to draw constant power from the PV panel while allowing the voltage on the link capacitor $C_{Dc}$ to vary over a relatively wide range. See, e.g., U.S. Patent Application Publication Nos. 2010/0157638 and 2010/0157632 which are incorporated by reference.

A problem with prior art approaches, however, is that the power may be processed sequentially through multiple power stages. But each stage introduces various inefficiencies, so the overall system efficiency is reduced. Also, since each stage must be designed to carry the full system power, the components in each stage must be sized accordingly, which may increase the cost and reduce the reliability of the components.

DETAILED DESCRIPTION

Figure 1:
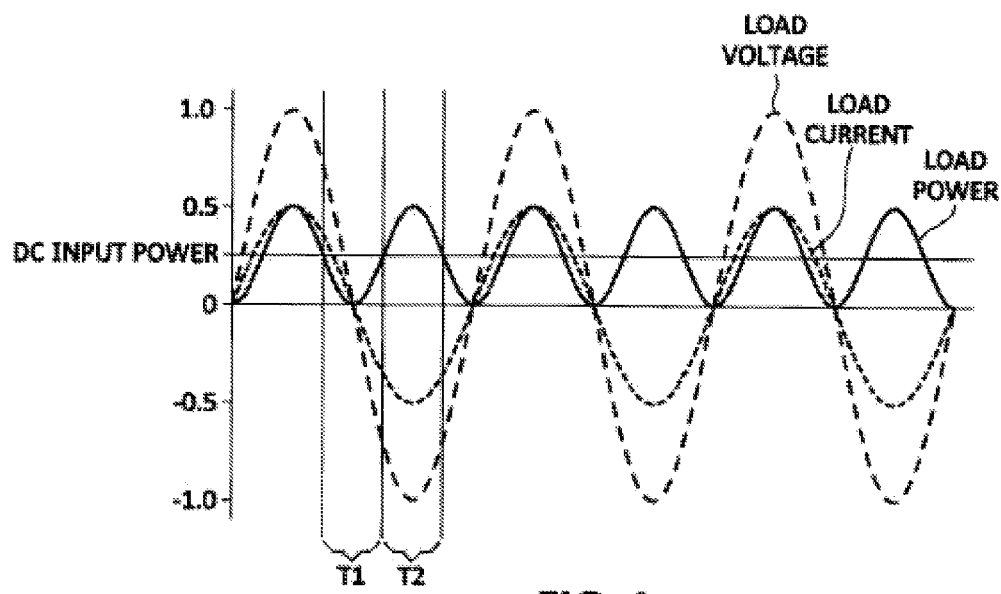
FIG. 1 illustrates the mismatch between a DC power source and an AC load.
Figure 2:
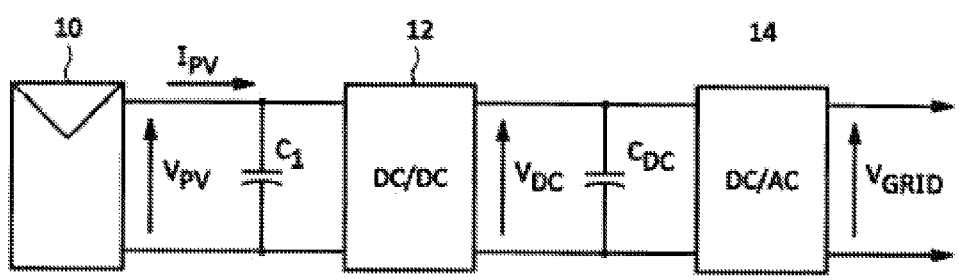
FIG. 2 illustrates a prior art system for converting DC power from a photovoltaic panel to AC power.
Figure 3:
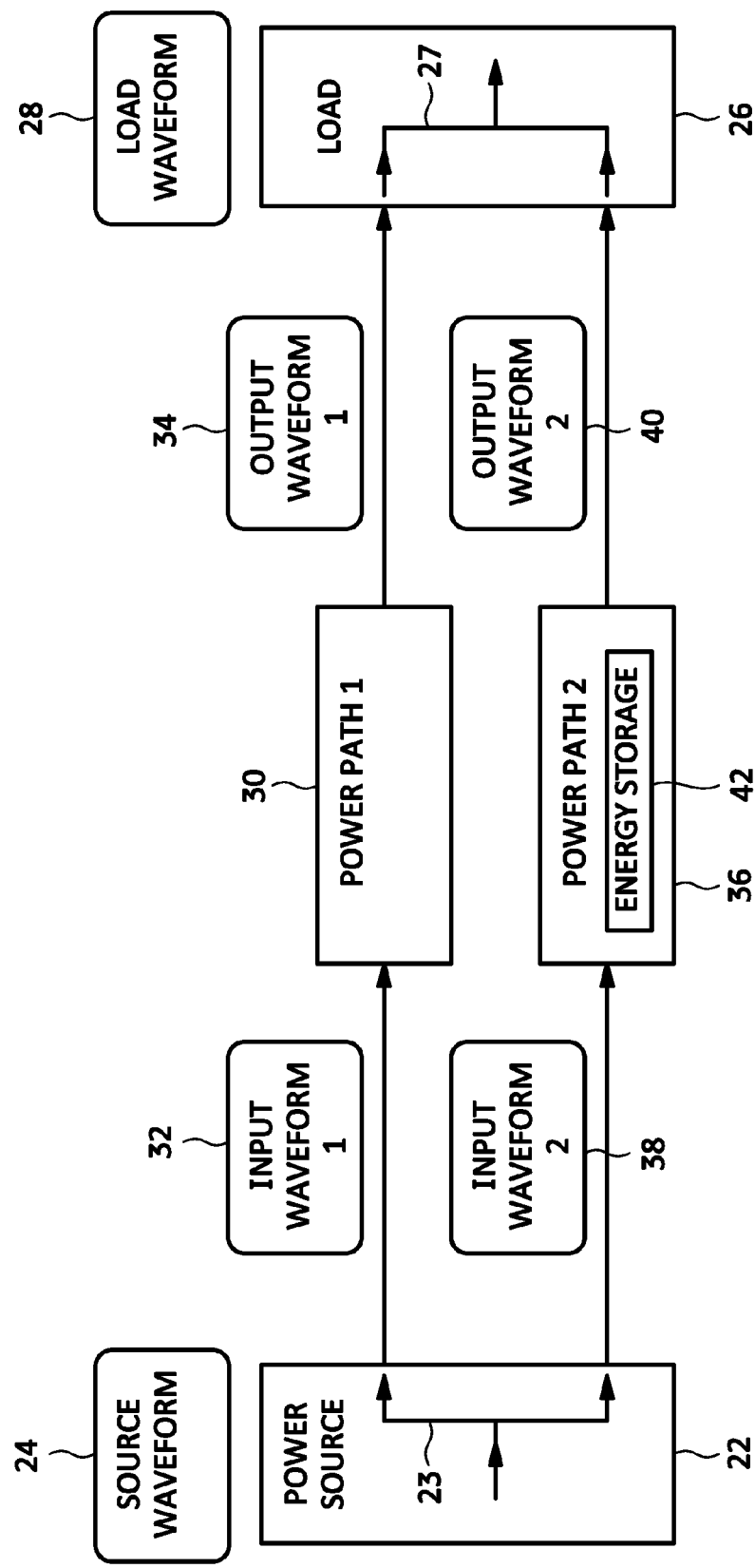
FIG. 3 illustrates an embodiment of an energy conversion system according to some inventive principles of this patent disclosure.

FIG. 3 illustrates an embodiment of a power conversion system according to some inventive principles of this patent disclosure. The embodiment of FIG. 3 includes a power source 22 having has a source waveform 24 that is generally required for optimum performance of the power source. For example, if the power source is a photovoltaic (PV) panel, the source waveform may be a flat quasi-constant power waveform. That is, the power available from the PV panel may appear to be constant on the scale of a few line cycles, but it may vary slowly over time in response to shading and/or changes in temperature, solar inclination, etc. As used herein, waveform with a constant value may refer to a truly constant value, or a quasi-constant value. If the power source is an AC generator, however, the source waveform may be a sine wave.

The embodiment of FIG. 3 also includes a load 26 having a load waveform 28 that is generally required for optimum performance of the load. As with the power source, the load waveform depends on the nature of a load. If the load includes an electrochemical battery, the load waveform may be a flat constant power waveform, whereas, if the load is a utility grid, the load waveform may be a sine wave.

Power is transferred from the power source to the load through a first power path 30 that has a first input waveform 32 and a first output waveform 34.

Power is also transferred from the power source to the load through a second power path 36 that has a second input waveform 38 and a second output waveform 40.

The first and second input waveforms 32 and 38 are complementary with respect to the source waveform 24, e.g., the source waveform 24 may split as shown by arrow 23 to form the first and second input waveforms 32 and 38. Thus, with the first and second power paths operating in parallel, the first and second input waveforms to the power paths combine to create a composite waveform that matches the source waveform of the power source.

Likewise, the first and second output waveforms 34 and 40 are complementary with respect to the load waveform 28, e.g., the first and second output waveforms 34 and 40 may combine (as shown by arrow 27) to form the load waveform 28. Thus, with the first and second power paths operating in parallel, the first and second output waveforms from the power paths combined to create a composite waveform that matches the load waveform of the load.

The first and second power paths 30 and 36 may include any suitable power conversion apparatus, typically one or more power stages such as rectifiers, inverters, commutators, push-pull stages, buck converters, flyback converters, etc.

The two paths may have different characteristics that enable the implementation of additional features according to some inventive principles of this patent disclosure. For example, in some embodiments, one path may have better efficiency than the other path, thereby enabling some power to be routed through the more efficient path and improving the overall efficiency of the system. As another example, one path may include energy storage capacity 42 while the other path does not include any substantial energy storage, or both paths may have equal energy storage, or both paths may have unequal but substantial energy storage. As yet another example, the two paths may have different numbers and/or types of power stages that enable the implementation of additional power conversion functionality according to some inventive principles of this patent disclosure.

Figure 4:
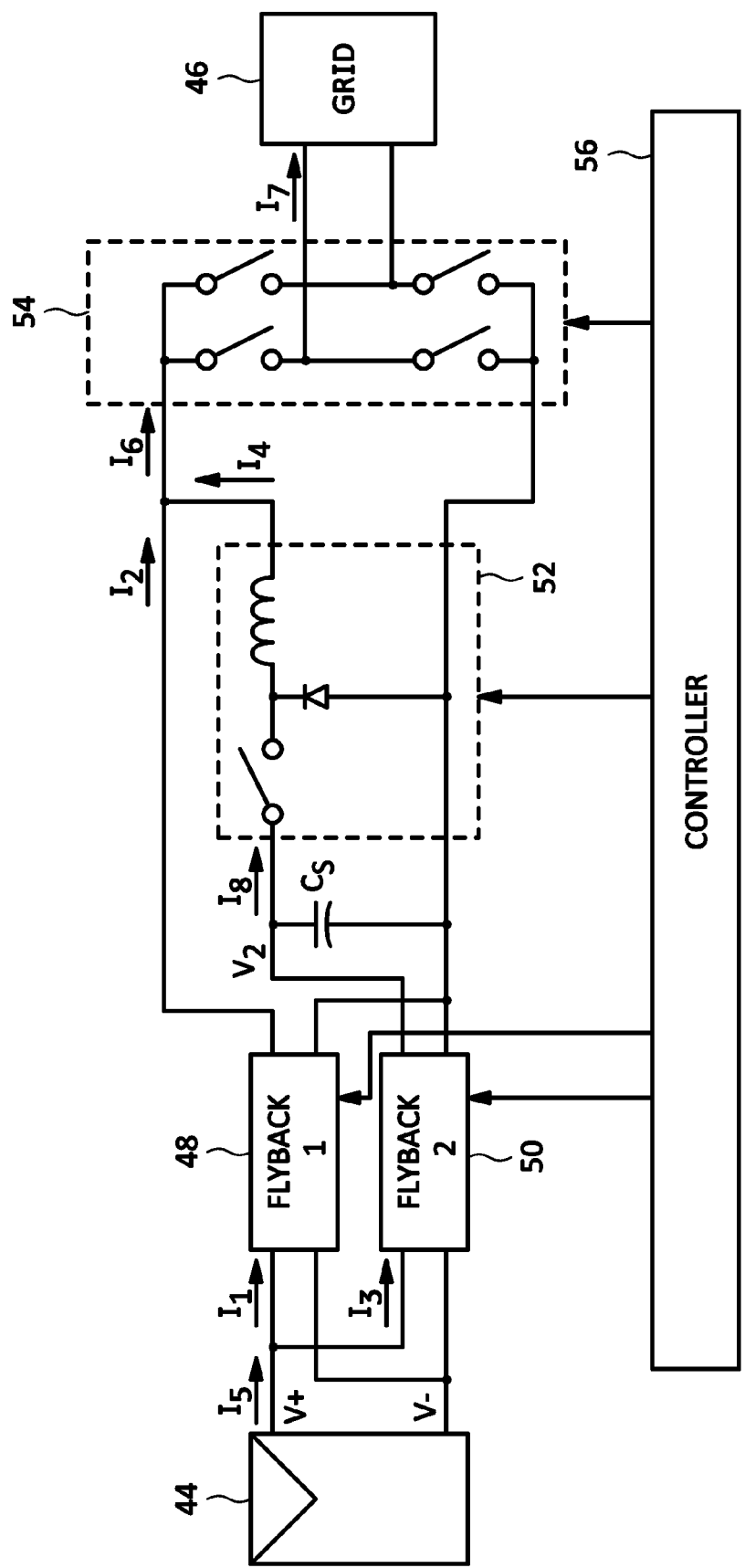
FIG. 4 illustrates an example embodiment of an energy conversion system according to some inventive principles of this patent disclosure.

FIG. 4 illustrates an example embodiment of a power conversion system according to some inventive principles of this patent disclosure. The embodiment of FIG. 4 is described in the context of a panel-mounted microinverter system for converting DC power from a solar panel to AC power that can be fed into a utility grid, but the inventive principles are not limited to these implementation details. Referring to FIG. 4, the power source is a PV panel 44 and the load is a utility grid 46. The first power path is essentially a flyback converter 48, while the second power path includes a flyback converter 50, an energy storage capacitor $C_S$, and a buck converter 52 configured as a current source. An H-bridge 54 is arranged as a simple commutator between the parallel connected power paths and the grid. A controller 56 includes monitoring and control circuitry to control the overall operation of the system.

Figure 5:
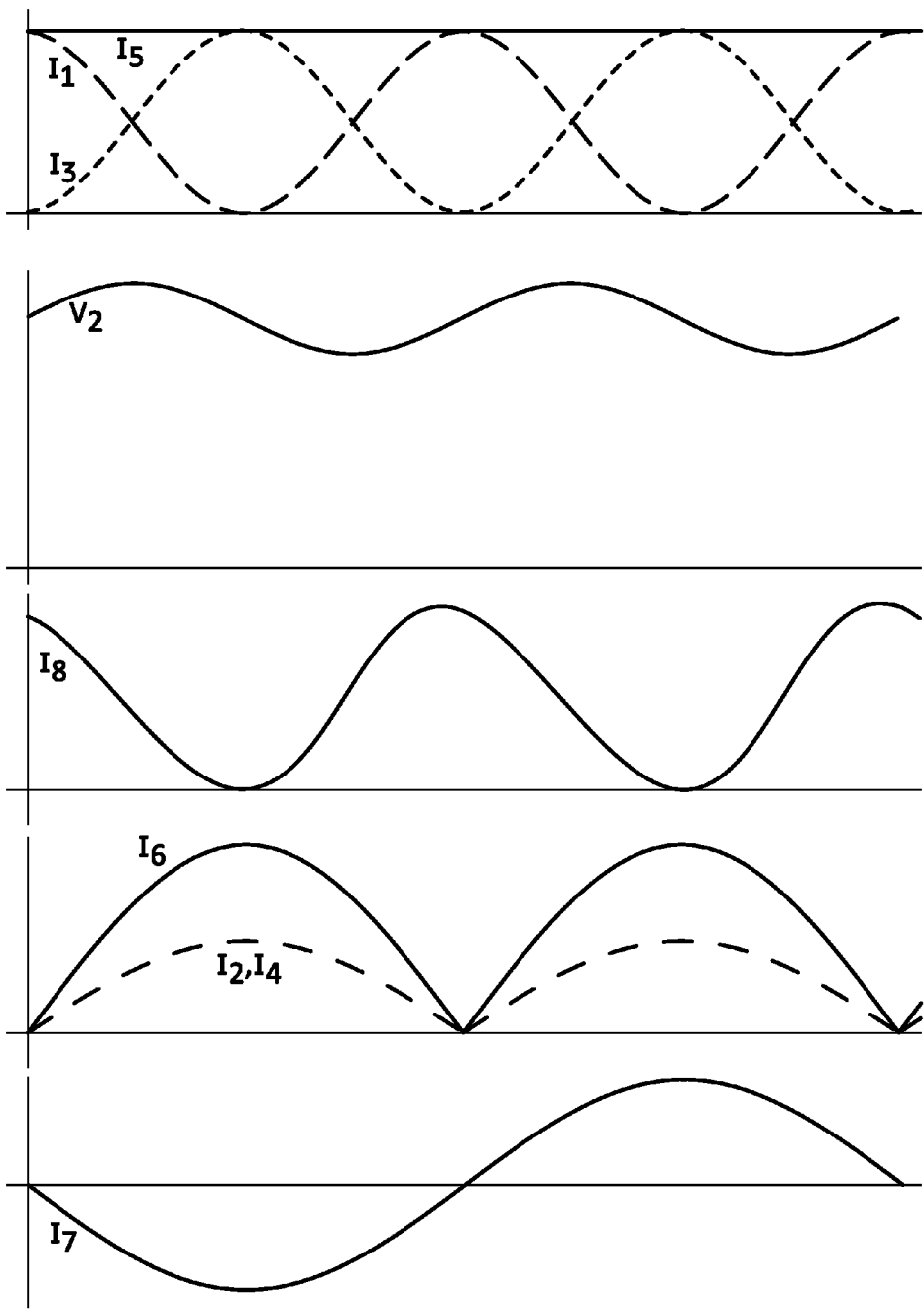
FIG. 5 illustrates waveforms within the embodiment of FIG. 4.

To operate at peak efficiency, power should be drawn from a PV panel as a pure DC waveform at current and voltage levels corresponding to the maximum power point (MPP). Thus, the source waveform is simply a flat DC value $I_5$ as shown in FIG. 5. At the downstream end of the system, the load is a conventional power grid, so the load waveform is a pure sinusoidal power waveform, preferably with the voltage component and current component $I_7$ in phase to achieve a power factor of one (unity).

To accommodate these input and output constraints while striving for a high level of efficiency, half of the power flows through the first power path which only includes a single power stage, in this example, a flyback converter 48. Because the first power path includes only a single power stage, it has a relatively high efficiency. However, because it does not include any substantial energy storage, the instantaneous power at its output must always match the instantaneous power at its input.

The output current $I_2$ from the first power path is a rectified sine wave which, when multiplied by the sinusoidal grid voltage, provides a sinusoidal power output equal to half of the total system output. The output power from the PV panel, however, is a constant DC value. Therefore, to match the instantaneous sinusoidal power output, the first power path draws power from the PV panel in the form of a sine-squared ($sine^2$) current waveform $I_1$ as shown in FIG. 5.

The other half of the power flows through the second power path which includes the second flyback converter 50. To maintain the output power from the PV panel at a constant value, the input current $I_3$ to the second power path must necessarily have a sine-squared waveform that is 180 degrees out of phase with $I_1$ so that $I_1$ and $I_3$ combine to provide a constant input current $I_5$ as shown in FIG. 5. Being out of phase with $I_1$ however, means that the second power path needs energy storage to shift the energy taken in at the input peaks in $I_3$ to the output peaks in $I_4$. This energy storage is provided by capacitor $C_S$ which receives the output from the second flyback converter. The second power path also includes a second power stage, in this example the buck converter 52 configured as a current source, following the energy storage capacitor to modulate the output current $I_4$ which is combined with the output current $I_2$ from the first power path to provide the combined output current $I_6$.

Thus, each power path provides one of the two currents $I_2$ and $I_4$ which are rectified sinusoidal currents at half the grid frequency. The two currents $I_2$ and $I_4$ are summed to provide the rectified sinusoidal current $I_6$ which is switched synchronously with the grid voltage. The H-bridge 54 then commutates the current $I_6$ so the resulting output current $I_7$ is sinusoidal and in phase with the grid voltage. The capacitor voltage $V_2$ and input current $I_8$ to the buck converter 52 are also shown in FIG. 5.

A potential advantage of the embodiment of FIG. 4 is that only half of the power delivered to the grid needs to be processed twice through the second power path which includes two power stages and the energy storage capacitor. The other half of the power flows directly through the first power path which only includes a single power stage, i.e., the first flyback converter 48, thus providing an opportunity for higher overall efficiency. Moreover, since only half of the power flows through the second power path, the components in this path need only be sized to handle half of the system power, thereby reducing the cost and improving the reliability of these components.

The embodiment of FIG. 4 may be modified in countless ways in accordance with the inventive principles of this patent disclosure. For example, the embodiment of FIG. 4 is shown as a single-phase implementation, but the inventive principles may be applied to three-phase and other types of systems as well. As another example, the flyback converters may be replaced with boost converters, in which case a switch may be added in series with the output of the first converter 48 and opened during times when the first boost converter is not providing power.

This is because a boost topology can typically only control the input current when the output voltage is greater than the input voltage. Non-isolated boost inverters may potentially provide higher efficiency operation, whereas flyback converters may make it easier to provide galvanic isolation.

Figure 6:
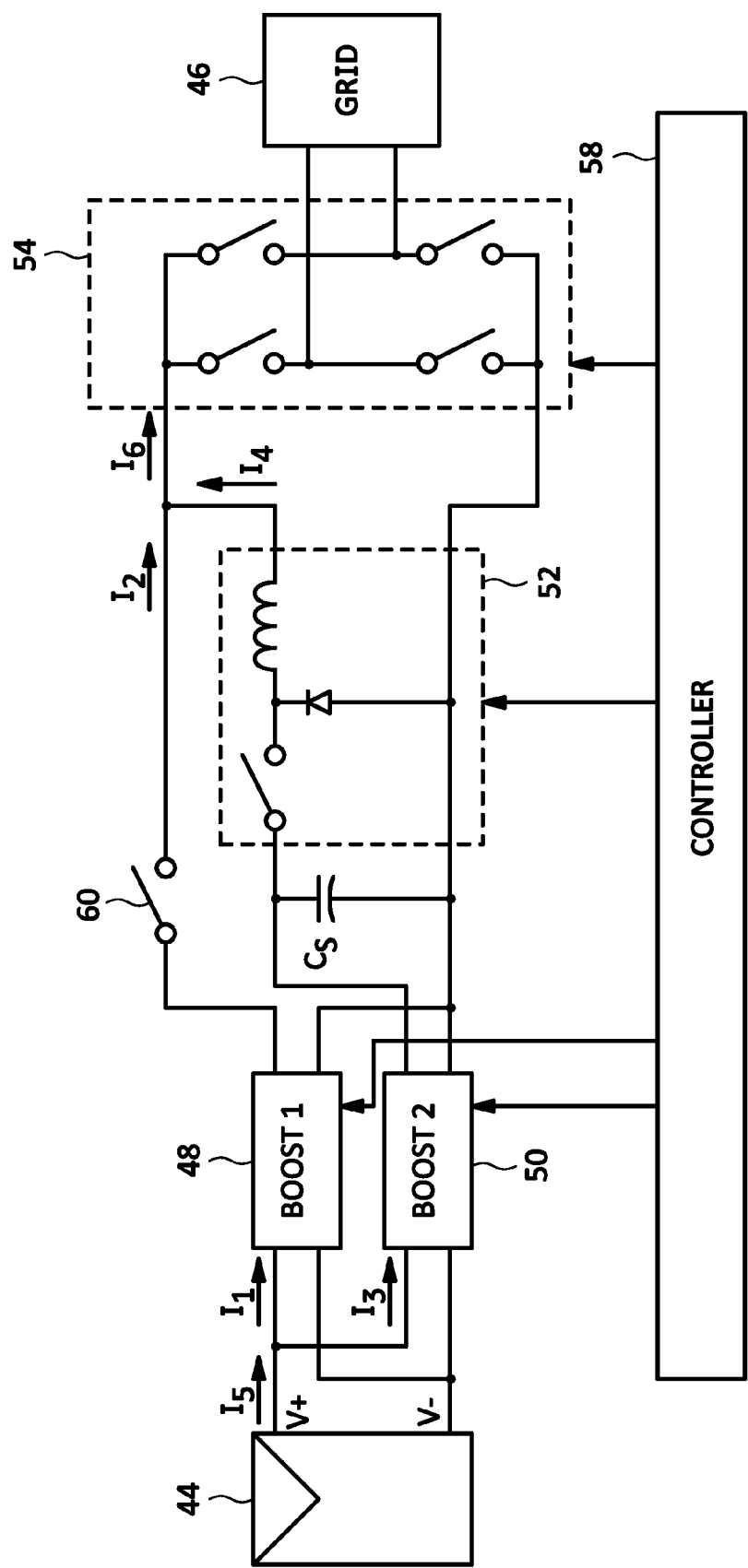
FIG. 6 illustrates another example embodiment of an energy conversion system according to some inventive principles of this patent disclosure.

FIG. 6 illustrates another example embodiment of a power conversion system according to some inventive principles of this patent disclosure. The embodiment of FIG. 6 is described in the context of a panel-mounted microinverter system for converting DC power from a solar panel to AC power that can be fed into a utility grid, but the inventive principles are not limited to these implementation details.

The embodiment of FIG. 6 is similar in structure to the embodiment of FIG. 4, however, the controller 58 is configured to operate the system in a manner that maximizes the amount of power transferred through the first power path. Since the first power path only includes a single power stage, this may optimize the system efficiency by transferring as much power as possible through the more efficient path.

Figure 7:
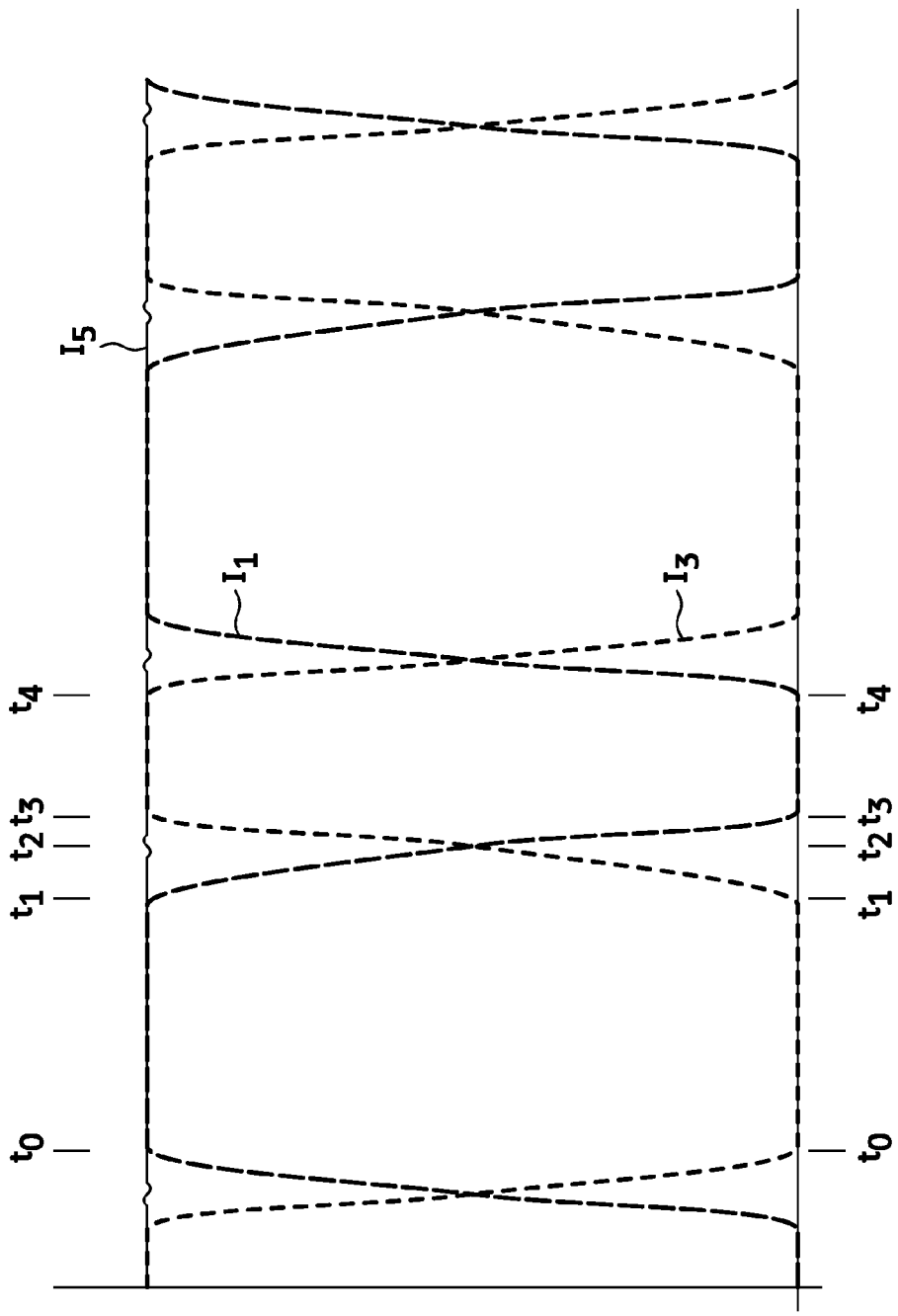
FIGS. 7 and 8 illustrate waveforms within the embodiment of FIG. 6.
Figure 8:
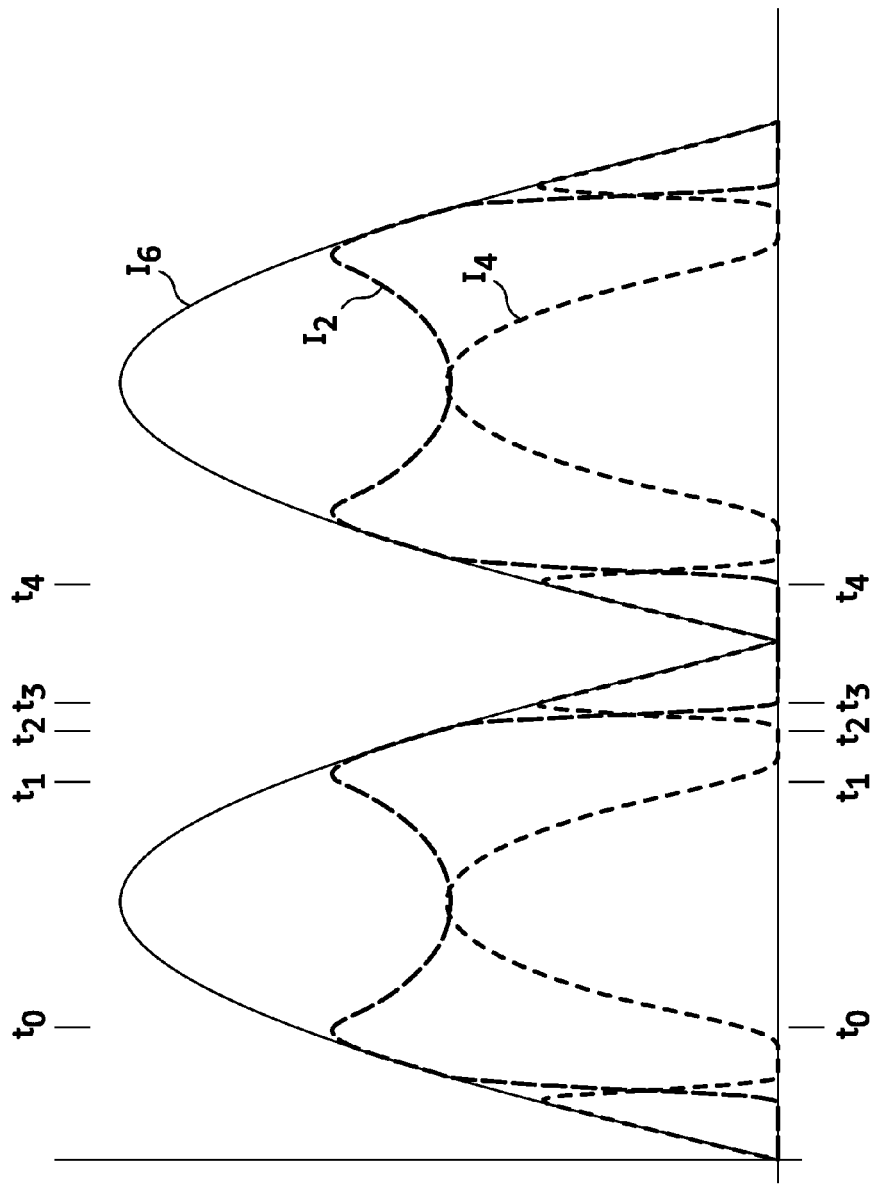

The operation of the embodiment of FIG. 6 is illustrated with the waveforms shown in FIGS. 7 and 8. Rather than splitting the input current equally between the two boost converters, the controller 58 causes the first boost converter 48 to transfer as much power as possible at each point in the line cycle of the grid load. Referring to FIG. 7, between time $t_0$ and time $t_1$, the input current $I_1$ to the first boost converter accounts for the entire input current $I_5$ to the system, and the input current $I_3$ to the second boost converter is zero. The output of the PV panel is essentially a constant voltage, and the current $I_1$ drawn from the panel during this time period is constant, and thus, a constant amount of power is drawn from the panel.

Since the first boost converter does not have any significant energy storage, this constant amount of power must be transferred to the output at each instant during the time between $t_0$ and time $t_1$. The voltage at the output of the first boost converter follows the rectified value of the grid voltage which is sinusoidal. Therefore, to maintain a constant product, and thus constant power at the output of the first boost converter, the output current $I_2$ from the first boost converter takes on the waveform shown in FIG. 8. The second power path outputs the current $I_4$ to make up the difference between $I_2$ and the (rectified) sinusoidal current waveform $I_6$ demanded by the grid. However, as shown in FIG. 7, the input current $I_3$ to the second power path is zero during the time between $t_0$ and time $t_1$, and therefore, all of the current $I_4$ is provided by charge stored on capacitor $C_S$.

The current $I_4$ is synthesized by the buck converter 52 in response to the PWM signal from the controller 58 so that when $I_1$ is added to $I_2$, the resulting combined current I6 is a rectified sinusoidal current that is switched synchronously with the grid voltage. After passing through the commutator 54, the resulting grid current is sinusoidal and in phase with the grid voltage.

Referring again to FIG. 7, at time $t_1$, the input currents $I_1$ and $I_3$ to the first and second boost converters begin a transition in which $I_1$ decreases while $I_3$ increases until time $t_3$ at which point the entire input current $I_5$ is attributed to $I_3$. The rate at which $I_1$ decreases is coordinated with the rate at which $I_3$ increases to maintain a constant sum between $I_1$ and $I_3$, and therefore, a constant power draw from the PV panel.

During the time period between $t_3$ and $t_4$, the first boost converter does not draw any power from the input, so the entire current $I_6$ is provided by the output current $I_4$ from the second boost converter. The second boost converter also charges the storage capacitor $C_S$ when the power it is drawing from the input exceeds the power it is providing to the output. For example, toward the midpoint of the time period between $t_3$ and $t_4$, the output current transitions through a V-shaped valley which provides the second boost converter with an opportunity to transfer a relatively large amount of charge to $C_S$.

In the transition period between times $t_1$ and $t_3$, the two power paths provide varying proportions of the total output current depending on the instantaneous amount of power the first boost converter can provide. The second power path then makes up the difference in the output current, and also takes advantage of additional opportunities to charge the storage capacitor $C_S$ during moments when the power it is drawing from the input exceeds the power it is providing to the output.

A switch 60 may be included in series with the output of the first boost converter. This switch may be opened during times when the first boost converter is not providing power to the output.

A potential advantage of the embodiment illustrated with respect to FIGS. 6-8 is that the average power may be weighted in favor of the first boost converter which has fewer power stages and higher efficiency and therefore may increase the overall efficiency of the system. For example, in some embodiments, the first power path may be able to handle a theoretical maximum of 67 percent of the total power. Depending on the implementation details, a practical implementation may be able to handle from 50-67 percent of the total power, thus providing an opportunity for higher overall efficiency.

The inventive principles of this patent disclosure have been described above with reference to some specific example embodiments, but these embodiments can be modified in arrangement and detail without departing from the inventive concepts. Such changes and modifications are considered to fall within the scope of the following claims.

The invention claimed is:

1. A power converter for converting direct current (DC) power generated by a DC source to alternating current (AC) power for supply to a power grid, the power converter comprising:
   a first power path having only one power stage configured to draw power from the DC source as a first sine-squared current waveform, wherein the first power path is configured to transfer a first portion of the power generated by the DC source to the power grid; and
   a second power path having at least two power stages, wherein the second power path is configured to transfer the remaining portion of the DC power generated by the DC to the power grid.

2. The power converter of claim 1, wherein the first portion of the DC power comprises a first half of the power generated by the DC source and the remaining portion comprises a second half of the DC power generated by the DC source.

3. The power converter of claim 2, wherein one of the at least two power stages of the second power path is configured to draw power from the DC source as a second sine-squared current waveform that is one hundred eighty degrees out of phase with the first sine-squared current waveform.

4. The power converter of claim 3, wherein the one power stage of the first power path is configured to generate, based on the first sine-squared current waveform, a first rectified sinusoidal current waveform with a frequency half that of a frequency of the power grid; and
   wherein the at least two power stages of the second power path are configured to generate, based on the second sine-squared current waveform, a second rectified sinusoidal current waveform with a frequency equal to and in phase with the first rectified sinusoidal current waveform.

5. The power converter of claim 4, further comprising a commutator configured to commutate a sum of the first rectified sinusoidal current waveform and the second rectified sinusoidal current waveform to generate an output sinusoidal current waveform to the power grid, wherein the output sinusoidal current waveform is in phase with a voltage waveform of the power grid.

6. The power converter of claim 5, wherein the one power stage of the first power path comprises a flyback converter.

7. The power converter of claim 5, wherein the second power path consists of a first power stage, a second power stage, and one or more energy storage components electrically coupled between the first power stage and the second power stage.

8. The power converter of claim 7, wherein the first power stage comprises a flyback converter; and
wherein the second power stage comprises a buck converter configured as a current source.

9. The power converter of claim 5, wherein an instantaneous power at an input of the first power path equals an instantaneous power at an output of the first power path when the first power path transfers the first half of the power generated by the DC source.

10. The power converter of claim 5, wherein the second power path comprises one or more energy storage components configured to cause the second sine-squared current waveform to be one hundred eighty degrees out of phase with the first sine-squared current waveform.

11. A method for converting direct current (DC) power generated by a DC source to alternating current (AC) power for supply to a power grid, the method comprising:
transferring a first portion of the DC power generated by the DC source through a first power path to the power grid, wherein the first power path has only one power stage and transferring the first portion of the DC power comprises drawing power, with the one power stage of the first power path, from the DC source as a first sine-squared current waveform; and
transferring the remaining portion of the DC power generated by the DC source through a second power path to the power grid, the second power path having at least two power stages.

12. The method of claim 11, wherein the first portion of the DC power comprises a first half of the power generated by the DC source and the remaining portion of the power comprises a second half of the DC power generated by the DC source.

13. The method of claim 12, wherein transferring the second half of the power comprises drawing power, with one of the at least two power stages of the second power path, from the DC source as a second sine-squared current waveform that is one hundred eighty degrees out of phase with the first sine-squared current waveform.

14. The method of claim 13, wherein transferring the first half of the power comprises generating, with the one power stage of the first power path and based on the first sine-squared current waveform, a first rectified sinusoidal current waveform with a frequency half that of a frequency of the power grid; and
wherein transferring the second half of the power comprises generating, with the at least two power stages of the second power path and based on the second sine-squared current waveform, a second rectified sinusoidal current waveform with a frequency equal to and in phase with the first rectified sinusoidal current waveform.

15. The method of claim 14, further comprising:
summing the first rectified sinusoidal current waveform and the second rectified sinusoidal current waveform to generate a third rectified sinusoidal current waveform; and
commutating the third rectified sinusoidal current waveform to generate an output sinusoidal current waveform to the power grid, the output sinusoidal current waveform being in phase with a voltage waveform of the power grid.

16. The method of claim 15, wherein the one power stage of the first power path comprises a flyback converter.

17. The method of claim 15, wherein the second power path consists of a first power stage, a second power stage, and one or more energy storage components electrically coupled between the first power stage and the second power stage.

18. The method of claim 17, wherein the first power stage comprises a flyback converter; and
wherein the second power stage comprises a buck converter configured as a current source.

19. The method of claim 15, wherein the second power path comprises one or more energy storage components to cause the second sine-squared current waveform to be one hundred eighty degrees out of phase with the first sine-squared current waveform.

20. A power converter for converting direct current (DC) power generated by a DC source to alternating current (AC) power for supply to a power grid, the power converter comprising:
a controller configured to (i) control a first power path of the power converter to transfer a first portion of the DC power generated by the DC source through the first power path to the power grid, wherein the first power path has only one power stage and (ii) control a second power path of the power converter to transfer the remaining portion of the DC power generated by the DC source through the second power path to the power grid, the second power path having at least two power stages,
wherein to transfer the first portion of the DC power generated by the DC source comprises to draw power from the DC source as a first sine-squared current waveform.

21. The power converter of claim 20, wherein the first portion of the DC power comprises a first half of the DC power generated by the DC source and the remaining portion of the DC power comprises a second half of the DC power generated by the DC source;
wherein to transfer the first half of the DC power comprises to, with the one power stage of the first power path, generate, based on the first sine-squared current waveform, a first rectified sinusoidal current waveform with a frequency half that of a frequency of the power grid; and
wherein to transfer the second half of the DC power comprises to (i) draw, with one of the at least two power stages of the second power path, power from the DC source as a second sine-squared current waveform that is one hundred eighty degrees out of phase with the first sine-squared current waveform and (ii) generate, with the at least two power stages and based on the second sine-squared current waveform, a second rectified sinusoidal current waveform with a frequency equal to and in phase with the first rectified sinusoidal current waveform.

22. The power converter of claim 21, wherein the controller is configured to control a commutator of the power converter to commutate a sum of the first rectified sinusoidal current waveform and the second rectified sinusoidal current waveform to generate an output sinusoidal current waveform to the power grid, wherein the output sinusoidal current waveform is in phase with a voltage waveform of the power grid.

* * * * *